United States Patent
Kawada

(10) Patent No.: US 7,554,078 B2
(45) Date of Patent: Jun. 30, 2009

(54) PHOTOELECTRIC ENCODER

(75) Inventor: Hiroaki Kawada, Kanagawa (JP)

(73) Assignee: Mitutoyo Corporation, Kawasaki (JP)

( * ) Notice: Subject to any disclaimer, the term of this patent is extended or adjusted under 35 U.S.C. 154(b) by 28 days.

(21) Appl. No.: 11/819,251

(22) Filed: Jun. 26, 2007

(65) Prior Publication Data

US 2008/0121788 A1    May 29, 2008

(30) Foreign Application Priority Data

Jun. 26, 2006  (JP)  .............................. 2006-174756

(51) Int. Cl.
*G01D 5/36* (2006.01)
(52) U.S. Cl. .............................. 250/231.13; 250/237 G
(58) Field of Classification Search ................................
250/231.11–231.18, 237 G; 33/1 PT, 1 TN,
33/1 R; 356/614, 616, 617
See application file for complete search history.

(56) References Cited

U.S. PATENT DOCUMENTS

| | | | |
|---|---|---|---|
| 7,186,969 B2* | 3/2007 | Shimomura et al. | 250/231.13 |
| 7,265,338 B2* | 9/2007 | Kiriyama et al. | 250/231.13 |
| 7,307,789 B2* | 12/2007 | Mizutani | 359/619 |
| 2003/0002162 A1* | 1/2003 | Hira | 359/619 |
| 2004/0173737 A1* | 9/2004 | Shimomura et al. | 250/231.13 |
| 2006/0056034 A1* | 3/2006 | Tsuruma | 359/626 |
| 2006/0139758 A1* | 6/2006 | Segawa et al. | 359/619 |
| 2006/0202112 A1* | 9/2006 | Mizutani | 250/231.13 |
| 2007/0018084 A1* | 1/2007 | Shimomura et al. | 250/231.13 |
| 2007/0187583 A1* | 8/2007 | Yaku et al. | 250/231.13 |
| 2008/0121788 A1* | 5/2008 | Kawada | 250/231.13 |

FOREIGN PATENT DOCUMENTS

JP         A 57-8502        1/1982

* cited by examiner

*Primary Examiner*—John R Lee
(74) *Attorney, Agent, or Firm*—Oliff & Berridge, PLC

(57) ABSTRACT

A photoelectric encoder using a lens array for dividing an image of a scale pattern into a plurality of regions to be detected and focusing them onto an array of light receiving elements, comprises, between the scale pattern and the lens array, a light-shielding array for reducing the effect of external disturbance light. The light-shielding array may be formed as a thin film pattern on a lens array side of a transparent cover glass which provides internal protection.

9 Claims, 6 Drawing Sheets

PHOTOELECTRIC ENCODER

This application claims priority from Japanese Patent Application No. 2006-174756, filed Jun. 26, 2006, in the Japanese Patent Office. The priority application is incorporated by reference in its entirety.

TECHNICAL FIELD

The present disclosure relates to a photoelectric encoder. The present disclosure especially relates to a photoelectric encoder suitable for the use in a linear encoder or the like, which comprises a lens array for dividing an image of a scale pattern into a plurality of regions to be detected and focusing them onto light receiving element.

RELATED ART

As shown in FIG. 1, a photoelectric encoder, which includes a lens array 12 as imaging optics for dividing an image of a scale pattern 10 into a plurality of regions to be detected 14 and focusing them onto an array of light receiving elements 16 has been studied.

However, in the configuration shown in FIG. 1, there is a possibility that those lights which have passed near the periphery of the lenses or between the lenses may reach the light receiving elements 16 as external disturbance lights 1, which may cause degradations in the resolution of the optics or in the outputs of the encoder.

As for a countermeasure against this problem from the side of the lens array 12, it may be contemplated to shield such external disturbance lights.

For example, Japanese Patent Unexamined Publication No. Sho. 57-8502 describes about forming plano convex lenses and, thereafter, providing a light shield by printing etc. over a flat space of the convex side.

However, in the method described in the Japanese Patent Unexamined Publication No. Sho. 57-8502, a thin film is later provided onto the lens array which already has concaves and convexes, so that there have been limits in the precision in the printing size and the accuracy in the position in relation to the lenses, making it difficult to offer further performance improvement and miniaturization.

SUMMARY

Embodiments of the present invention provide a photoelectric encoder which reduces, easily and reliably, the degradations in the resolution of the optics and in outputs from the photoelectric encoder.

Embodiments of the present invention relates to a photoelectric encoder using a lens array for dividing an image of a scale pattern into a plurality of regions to be detected and focusing them onto a light receiving element, wherein the photoelectric encoder comprises a light-shielding array between the scale pattern and the lens array in order to reduce the effect of external disturbance lights.

The light-shielding array may be placed on the lens array side of a transparent cover plate for internal protection.

The light-shielding array may be constituted by a thin film pattern.

The imaging optics including the lens array may be a single-sided or double-sided telecentric optical system.

A light-shielding array for reducing the effect of external disturbance light may also be provided in front of the light receiving element.

The light receiving element may be implemented as an IC which is mounted over a cover glass integrated with the light-shielding array, thereby constituting a Chip-on-Glass (COG).

According to the present invention, the degradations in the resolution of the optics and in the output of the photoelectric encoder due to external disturbance light may be reduced easily and reliably.

Other features and advantages may be apparent from the following detailed description, the accompanying drawings and the claims.

DETAILED DESCRIPTION

Embodiments of the present invention will now be explained in detail with reference to figures.

Figure 1:
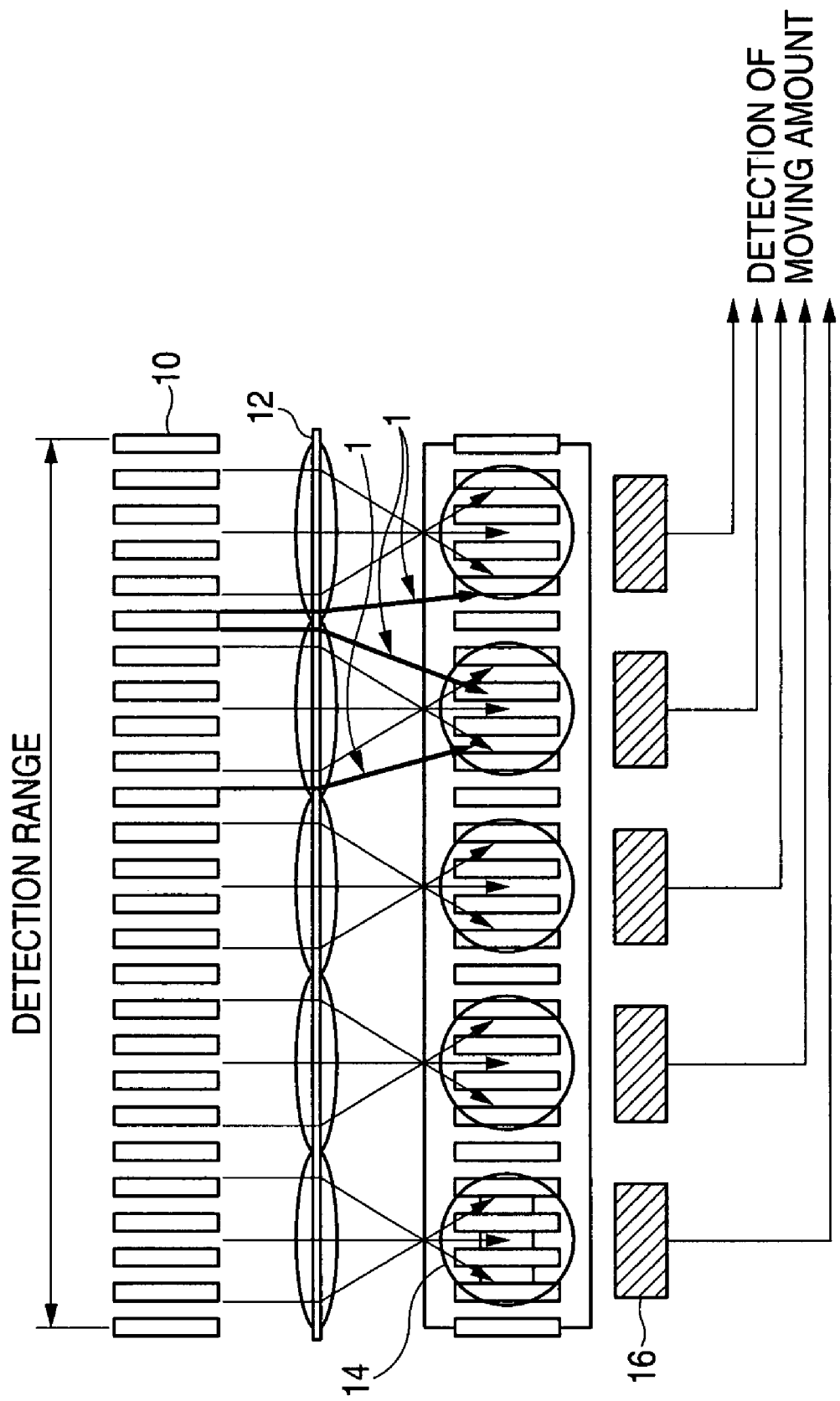
FIG. 1 is a ray diagram of an exemplary photoelectric encoder using a lens array for focusing images on the side of the light receiving elements.
Figure 2:
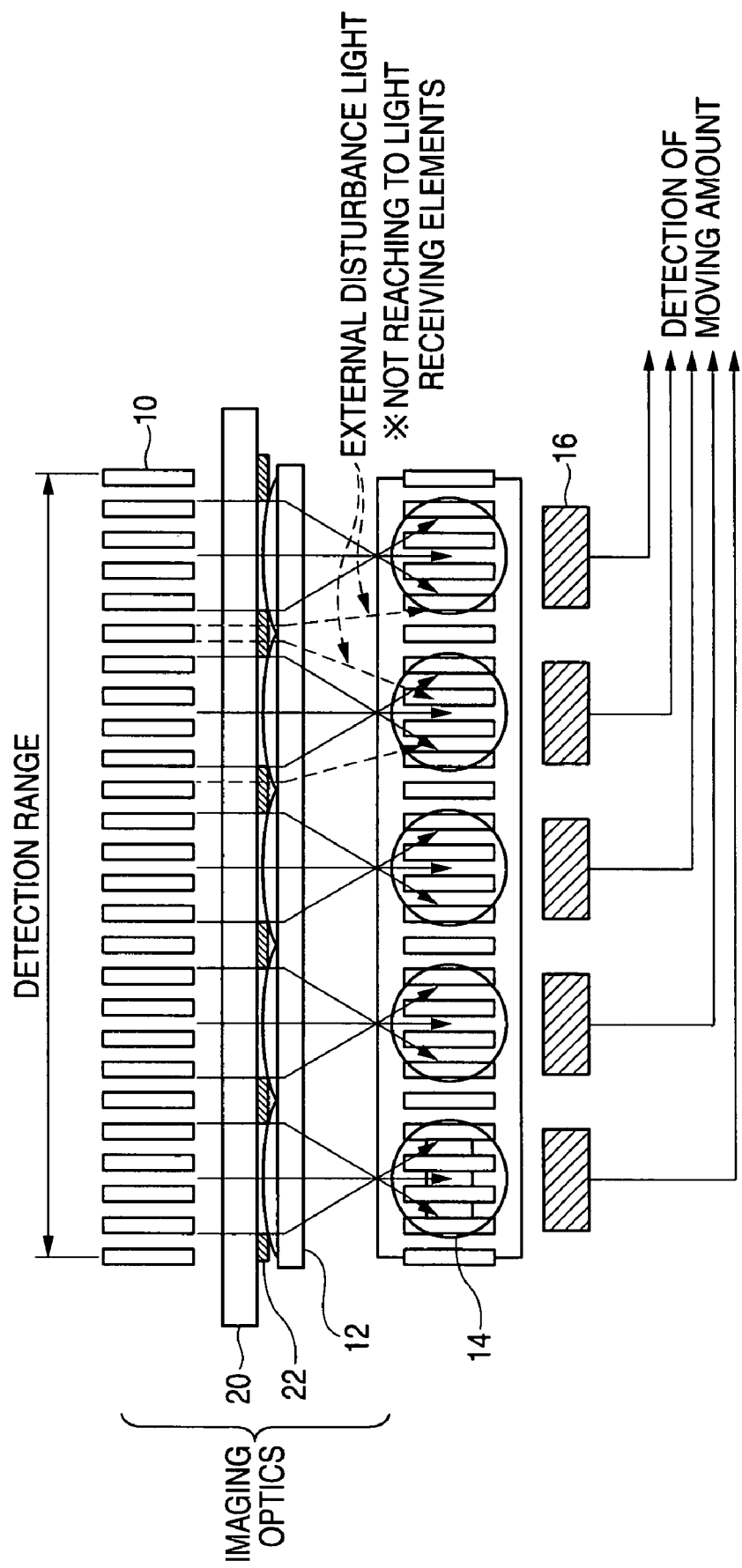
FIG. 2 is a ray diagram showing the configuration of the first embodiment of the present invention.

A first embodiment of the present invention, as shown in FIG. 2, is a photoelectric encoder similar to the one shown in FIG. 1, in which a light-shielding array 22 is formed on a lens array 12 side of a cover glass 20 for internal protection which is placed between the scale pattern 10 and the lens array 12.

Figure 3A:
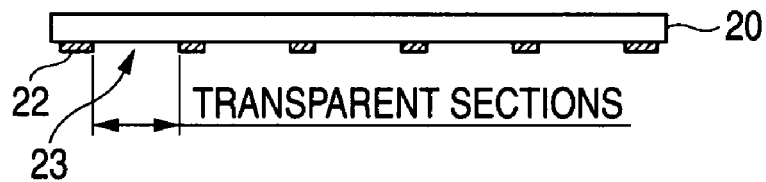
FIG. 3A is a side view showing a light-shielding array used in the first embodiment.
Figure 3B:
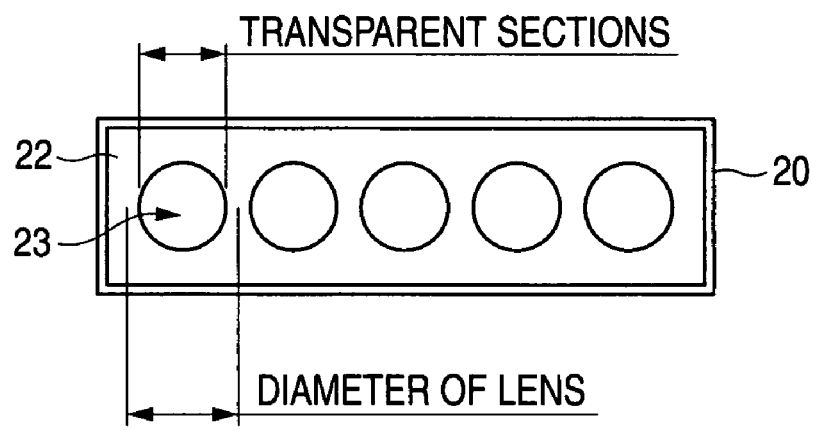
FIG. 3B is a plane view showing a light-shielding array used in the first embodiment.

The light-shielding array 22, as shown in FIG. 3 A (side view) and 3B (plane view), is provided integrally on a glass substrate which constitutes the cover glass 20, by forming, through vapor deposition, laser lithography, or lithography etc., a thin film pattern made of i.e. chrome, aluminum or silver, in which transparent sections 23 having a diameter that is smaller than that of the lenses are secured.

Figure 4:
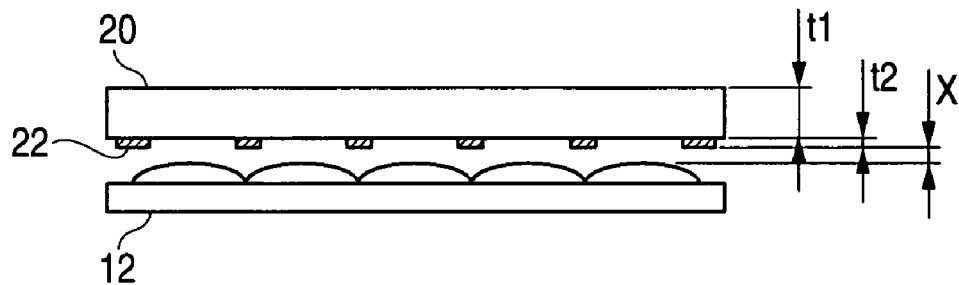
FIG. 4 is a side view showing the positional relationship between the lens array and the cover glass in the thickness direction.

FIG. 4 shows a positional relationship between the lens array 12 and the cover glass 20 in the thickness direction. The thickness t2 of the light-shielding array 22 is desirably as small as possible in order to eliminate the effect of reflection etc., and it is achieved by the use of the thin film pattern whose thickness may be controlled equal to or below 1 μm. Furthermore, the cover glass, as well as being a constituent member of the optics, assumes a role of protecting the detector against external force such as impact etc., so that it is preferred that its thickness t1 is relatively large, such as 1 to 2 mm. On the other hand, the gap X between the lens array 12 and the light-shielding array 22 shall have to be limited to 0 to 0.5 mm in order to prevent the interference between lights incident on neighboring lenses. As for these limitations, they may be accommodated by placing the light-shielding array 22 between the incident side of the lens array 12 and the cover glass 20 as shown in FIGS. 2 and 4

In FIGS. 2 and 4, each lens of the lens array 12 is a piano convex lens, however, it may also be any other type of lens such as double-convex lens. The array arrangements and shapes of the lens array 12 and the light-shielding array 22 may be linear or two-dimensional, and circular or square respectively, and there is no limitation therefor. The cover glass 20 is not limited to the one made of glass, it may also be a transparent resin. Furthermore, instead of forming the light-shielding array 22 on the cover glass, it may be formed as, i.e. a metal plate, which is separate from the cover glass.

Figure 5:
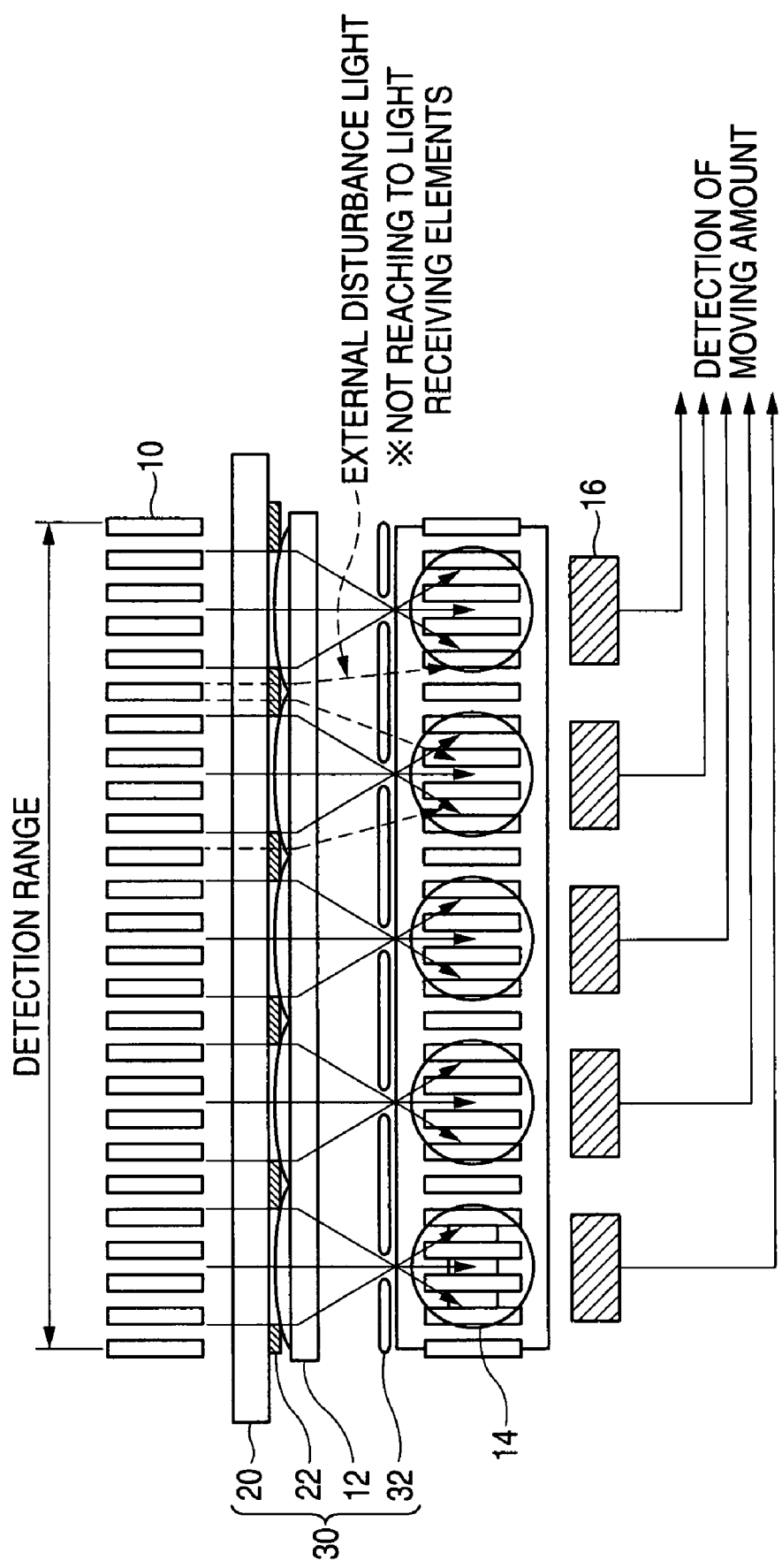
FIG. 5 is a ray diagram showing the configuration of the second embodiment of the present invention.

Next, FIG. 5 shows a second embodiment of the present invention in which the imaging optics including the lens array is constituted by a single-sided telecentric optical system.

In the present embodiment, the single-sided telecentric optical system 30 is constituted by adding, to the configuration shown in FIG. 2, an aperture array 32 at the focal position of the lens array 12. In this way, the performance may further be enhanced.

Figure 6:
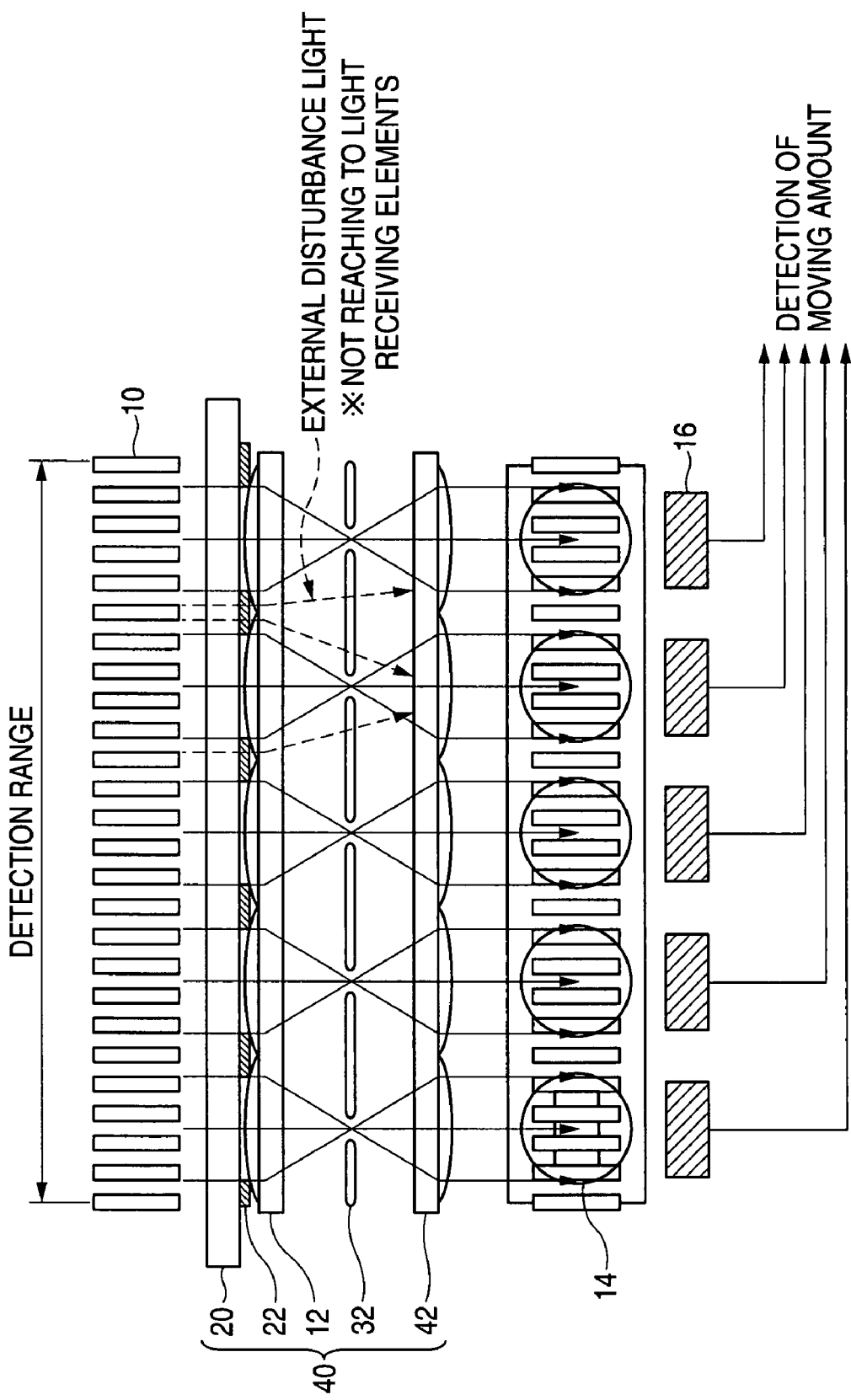
FIG. 6 is a ray diagram showing the configuration of the third embodiment of the present invention.

FIG. 6 shows a third embodiment of the present invention in which the imaging optics including the lens array is constituted by a double-sided telecentric optical system.

In the present embodiment, the double-sided telecentric optical system 40 is constituted by adding, to the configuration of the embodiment shown in FIG. 5, a further lens array 42 on the side of the light receiving elements. In this way, the performance may further be enhanced.

Figure 7:
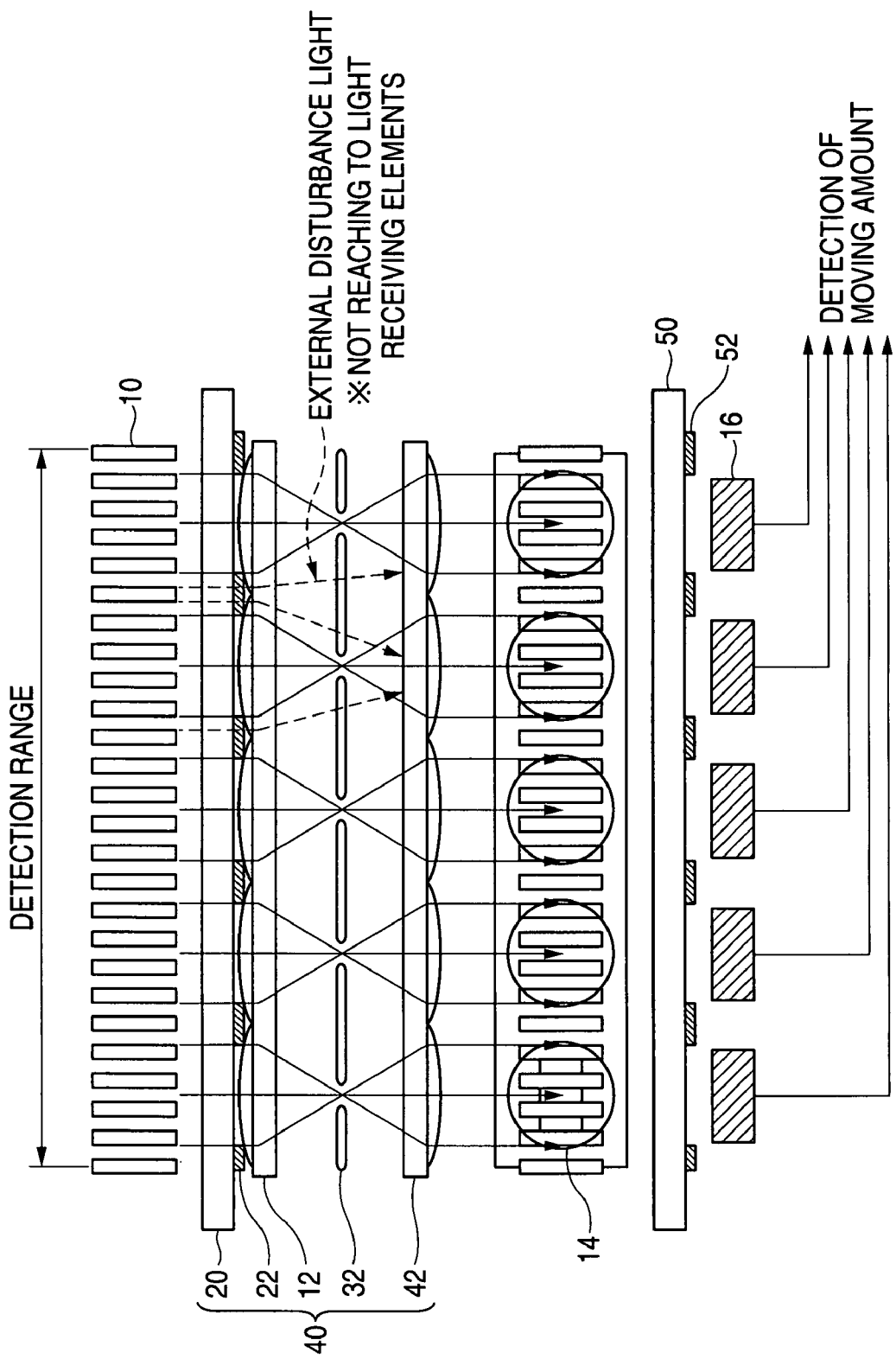
FIG. 7 is a ray diagram showing the configuration of the fourth embodiment of the present invention.

FIG. 7 shows a fourth embodiment of the present invention in which, in addition to the third embodiment shown in FIG. 6, a cover glass 50 having a light-shielding array 52 formed thereon, immediately in front of the array of the light receiving elements 16, is provided. According to this embodiment, the light-shielding capability against the external disturbance light is improved, so that further performance enhancement may be expected.

The similar effect can be obtained in the first and second embodiments shown in FIGS. 2 and 5 by adding the cover glass 50 having the light-shielding array 52 formed thereon immediately in front of the array of light receiving elements 16.

Furthermore, a Chip-on-Glass (COG) may also be used, in which the array of the light receiving elements 16 in FIG. 7 is implemented as an IC which is mounted over the cover glass 50 integrated with the light-shielding array 52.

In any of the aforementioned embodiments, the array of light receiving elements in which the light receiving elements are arranged in a grating pattern has been used, however, the grating and the light receiving elements may be implemented in separate bodies.

While the present invention has been described with respect to a limited number of embodiments, those skilled in the art, having benefit of this disclosure, will appreciate that other embodiments can be devised which do not depart from the scope of the present invention as disclosed herein. Accordingly, the scope of the present invention should be limited only by the attached claims.

What is claimed is:

1. A photoelectric encoder comprising:
   a scale pattern;
   a light receiving element;
   a first lens array for dividing an image of the scale pattern into a plurality of regions to be detected and focusing them onto the light receiving element; and
   a first light-shielding array that reduces an effect of external disturbance lights, the first light-shielding array being disposed between said scale pattern and said first lens array.

2. A photoelectric encoder as claimed in claim 1 further comprising:
   a transparent cover plate that provides internal protection, the cover plate being disposed between said scale pattern and said first lens array, wherein said first light-shielding array is provided on a first lens array side of the cover plate.

3. A photoelectric encoder as claimed in claim 2 wherein said first light-shielding array is constituted by a thin film pattern.

4. A photoelectric encoder as claimed in claim 1 wherein imaging optics including said first lens array is a single-sided telecentric optical system.

5. A photoelectric encoder as claimed in claim 1 wherein imaging optics including said first lens array is a double-sided telecentric optical system.

6. A photoelectric encoder as claimed in claim 1 further comprising:
   a second light-shielding array disposed on a cover glass, the cover glass disposed immediately in front of said light receiving element, that reduces the effect of the external disturbance lights, the second light-shielding array being disposed on a side of the cover glass that faces said light receiving element.

7. A photoelectric encoder as claimed in claim 1 further comprising:
   a second light-shielding array which reduces the effect of the external disturbance lights, the second light-shielding array formed integrally with a cover glass,
   wherein the light receiving element is an IC, the IC mounted on the cover glass as a Chip-on-Glass.

8. A photoelectric encoder as claimed in claim 1 further comprising:
   an aperture array disposed at a focal position of the first lens array.

9. A photoelectric encoder as claimed in claim 8, further comprising a second lens array disposed on the light receiving element side of the aperture array.

* * * * *